US012718142B2

(12) United States Patent
Lugo et al.

(10) Patent No.: US 12,718,142 B2

(45) Date of Patent: Aug. 25, 2026

(54) AUTOMATIC DATA QUALITY MONITORING USING MACHINE LEARNING

(71) Applicant: HEWLETT PACKARD ENTERPRISE DEVELOPMENT LP, Houston, TX (US)

(72) Inventors: Wilfredo E. Lugo, Aguadilla, PR (US); Robert Mccarthy, Granite Bay, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 1179 days.

(21) Appl. No.: 17/688,547

(22) Filed: Mar. 7, 2022

(65) Prior Publication Data

US 2023/0281505 A1 Sep. 7, 2023

(51) Int. Cl.
*G06N 20/00* (2019.01)

(52) U.S. Cl.
CPC .................................... *G06N 20/00* (2019.01)

(58) Field of Classification Search
CPC ........... G06N 20/00; G06N 20/20; G06N 5/01
See application file for complete search history.

(56) References Cited

U.S. PATENT DOCUMENTS 7,499,897 B2 3/2009 Pinto et al.
7,562,058 B2 7/2009 Pinto et al.
7,725,300 B2 5/2010 Pinto et al.
7,730,003 B2 6/2010 Pinto et al.
7,849,027 B2 12/2010 Koran et al.
7,933,762 B2 4/2011 Pinto et al.
8,165,853 B2 4/2012 Pinto et al.
(Continued)

FOREIGN PATENT DOCUMENTS

WO WO-2018005489 A1 * 1/2018 ........... G06F 3/0482
WO WO-2021087129 A1 * 5/2021 ............. G06N 20/00

OTHER PUBLICATIONS

Mohamed Reda Bouadjenek, Karin Verspoor, Justin Zobel, Literature consistency of bioinformatics sequence databases is effective for assessing record quality, Database, vol. 2017, 2017, bax021, https://doi.org/10.1093/database/bax021 (Year: 2017).*
(Continued)

*Primary Examiner* — Luis A Sitiriche
(74) *Attorney, Agent, or Firm* — Hewlett Packard Enterprise

(57) ABSTRACT

Systems and methods are provided for measuring data set quality by applying Machine Learning (ML) to the data set, identifying good/bad records therein, and further identifying or scoring the records and data sets reflecting whether or not they are good or bad. Knowledge of the goodness or badness of the records of the data sets may enable a user to make determinations or take actions according to the records or data set with respect to further analytics based on the records. Use of an ML model may help avoid problems that arise when trying to manually monitor/classify records or generate code to decide if a record is good or bad in view of multi-field interdependencies. Moreover, training the ML model to compensate for new rules may be less complex than trying to manually account for or generate code to account for such new rules.

20 Claims, 6 Drawing Sheets

(56) References Cited

U.S. PATENT DOCUMENTS

| | | | |
|---|---|---|---|
| 8,170,841 B2 | 5/2012 | Pinto et al. | |
| 8,751,273 B2 | 6/2014 | Pinto et al. | |
| 9,390,112 B1* | 7/2016 | Daly | G06F 16/2365 |
| 2018/0307943 A1 | 10/2018 | Savkli et al. | |
| 2022/0147509 A1* | 5/2022 | Muddu | G06N 5/022 |

OTHER PUBLICATIONS

Cai, Li, and Yangyong Zhu. "The challenges of data quality and data quality assessment in the big data era." Data science journal 14 (2015): 2-2. (Year: 2015).*

* cited by examiner

COMPUTING COMPONENT 300

HARDWARE PROCESSOR 302

MACHINE-READABLE STORAGE MEDIA 304

TRAIN A MODEL BASED ON A FIRST SET OF APPROVED RECORDS AND A SECOND SET OF DECLINED RECORDS 306

APPLY THE TRAINED MODEL TO EACH RECORD OF A RECORD SET OF INTEREST 308

GENERATE A QUALITY SCORE FOR EACH RECORD BASED ON APPLICATION OF THE TRAINED MODEL TO EACH RECORD 310

CALCULATE, FOR THE RECORD SET, A DATA QUALITY INDEX BASED ON AVERAGING THE QUALITY SCORE FOR EACH RECORD OF THE RECORD SET 312

APPLY ONE OR MORE CLEANSING OPERATIONS TO THE RECORD SET 314

REAPPLY THE TRAINED MODEL TO EACH RECORD OF THE CLEANSED RECORD SET TO GENERATE A REVISED QUALITY SCORE FOR EACH RECORD 316

CALCULATE, FOR THE CLEANSED RECORD SET, A DATA SET QUALITY INDEX 318

MODIFY THE ONE OR MORE CLEANSING OPERATIONS BASED ON THE DATA QUALITY INDEX FOR THE RECORD SET AND THE DATA QUALITY INDEX FOR THE CLEANSED RECORD SET 320

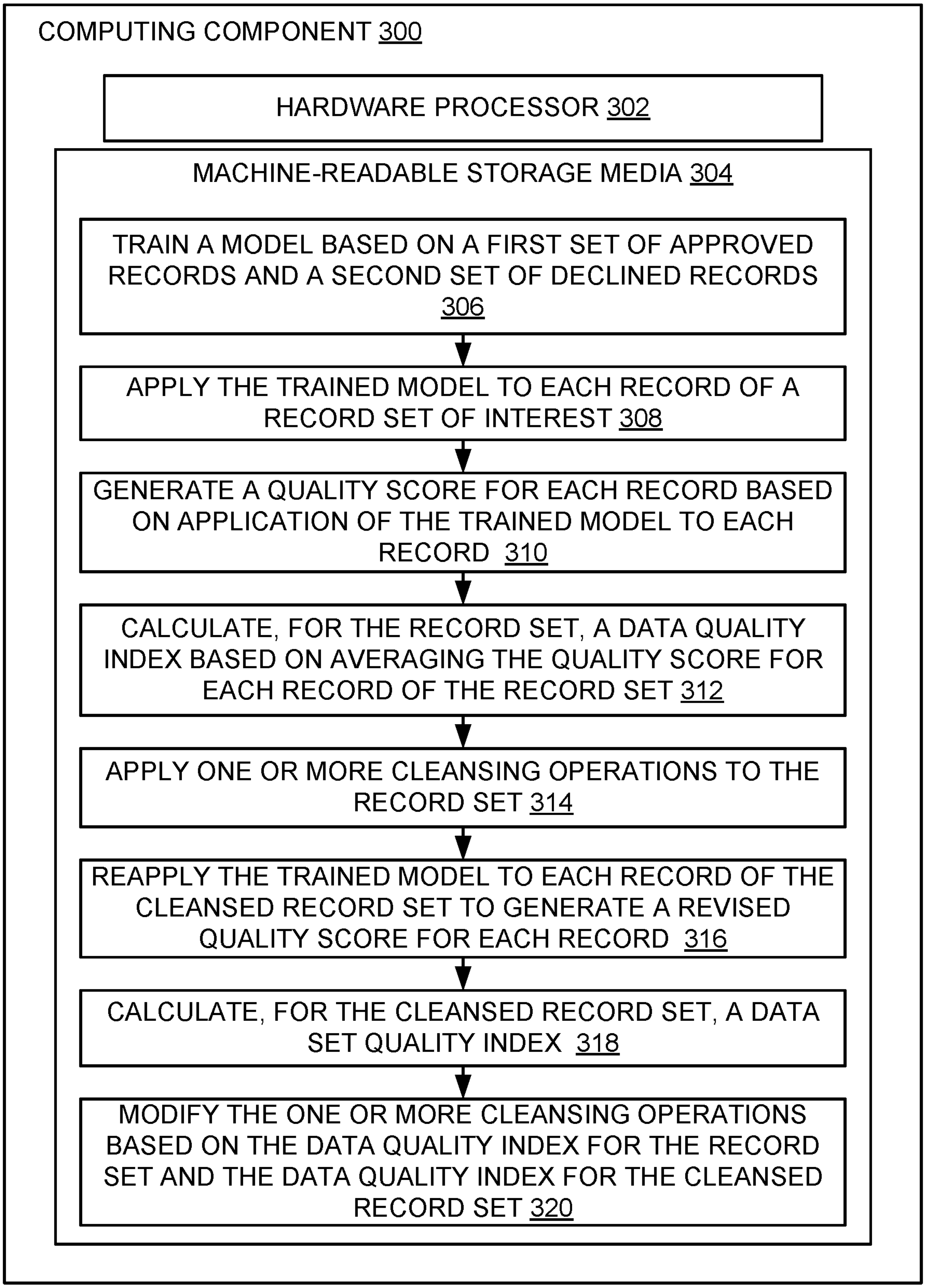

FIG. 3

AUTOMATIC DATA QUALITY MONITORING USING MACHINE LEARNING

BACKGROUND

Data analytics systems, platforms, and frameworks can perform various analytics on data inputs. Often, these systems, platforms, and frameworks may be trained with known training data that generate known outputs such that the systems, platforms, and frameworks may learn to generate predicted outputs based on real-world inputs.

BRIEF DESCRIPTION OF THE DRAWINGS

The present disclosure, in accordance with one or more various examples, is described in detail with reference to the following figures. The figures are provided for purposes of illustration only and merely depict typical or example examples.

FIG. 3 illustrates an example computing component that may be used to implement model optimization for an example model that scores data used in analytical applications in accordance with various examples.

Figure 1:
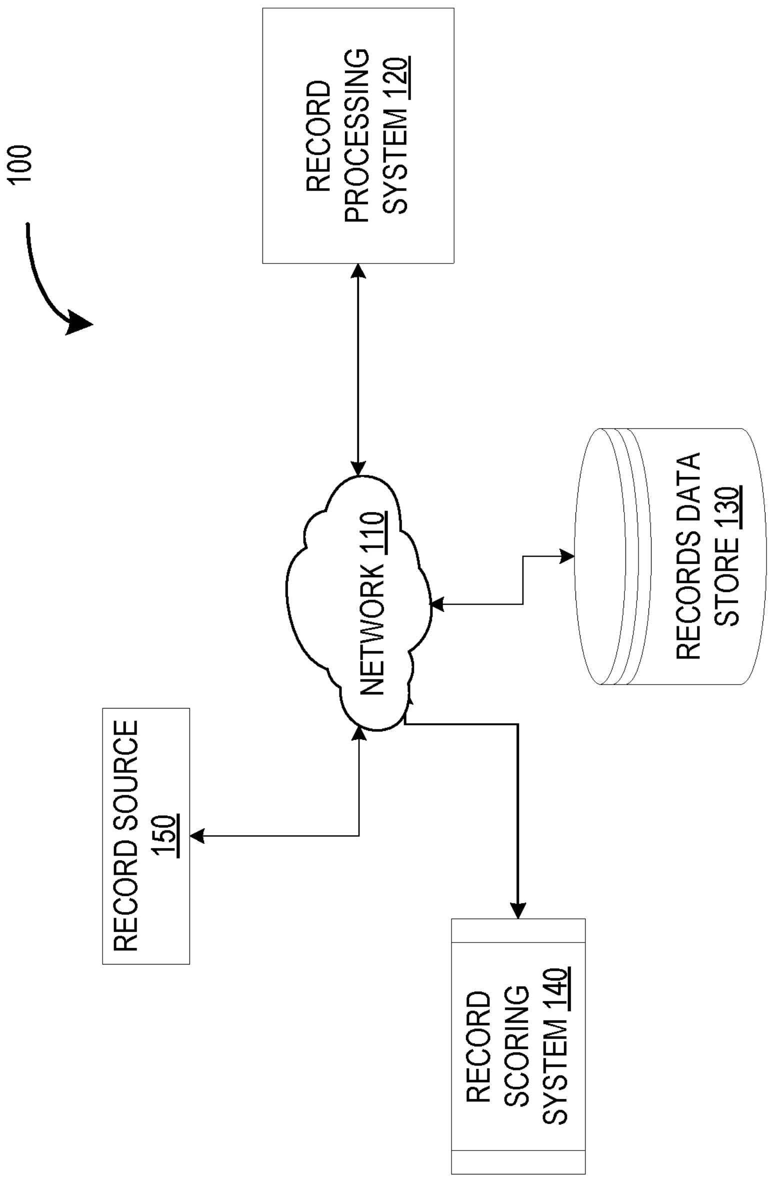
FIG. 1 illustrates an example networked environment 100 that implements various features of examples described in the present disclosure.

The figures are not exhaustive and do not limit the present disclosure to the precise form disclosed.

DETAILED DESCRIPTION

In data analytics, models, platforms, and frameworks (referred to herein as "data systems"), the quality of processing by the data systems and the quality of the data being utilized are critical to generating meaningful predicted outcomes. The quality of processing by the data systems may correspond to one or more of an efficiency of the data system, an accuracy of the data system, and capabilities of the data system. The data systems may be trained using training data to predict outputs based on real-world input data. Each of the efficiency, accuracy, and capabilities of the data systems may be improved based on the training.

However, regardless of the efficiency, accuracy, and capabilities of the data systems, the output generated by the data system is directly impacted by a quality of the real-world input data going into the data system. That is, the output of the data system is only as good as the real-world input data going into the data system. Thus, if the input data into the data system is bad, the output predicted by the system will be bad, no matter how good the efficiency, accuracy, and/or capabilities of the data system are. Good input data may correspond to input records and/or data that are complete and/or include appropriate values that enable the data systems to generate a predicted output corresponding to or based on the input records. Bad input data may comprise data and/or records that is incomplete or includes inappropriate or incorrect values that cause the data systems to generate bad outputs or otherwise, outputs that do not meet desired quality standards, e.g., inaccurate predictions.

In some examples, the input data may correspond to a data set of records, where certain records are good records and other records are bad records. Given the volumes, varieties, and velocity of changes of the records and data sets processed by the data systems, for example, when performing Big Data analyses, manual monitoring of the records and data sets to identify good or bad records is impractical, if not impossible. Attempting to apply and maintain a complex set of rules, checks, and procedures manually or even automatically to individually identify and score good or bad records in an agile or rapidly changing data environment may be resource intensive. For example, the data sets into the data systems may be too voluminous for manual monitoring and classification by an entity having knowledge and capabilities to identify and classify the good versus bad records. Thus, users of the records and the data sets do not know whether the records or data sets the users are using for various analytics are good or bad, which means that the user do not know whether the predicted outputs are good or bad.

The disclosed technology presents a way to measure a quality of a data set by applying Machine Learning to the data set. More specifically, the disclosed technology may identify good and bad records in data sets input into the data systems and further identify or score the records and the data sets on a scale indicating whether the records and the data sets are good or bad. For example, the disclosed technology can generate a quality value for each record in a data set that is input into the data system and further generate an aggregated quality index for the entire data set to which the records belong. In some examples, the disclosed technology implements a machine learning (ML) model that generates the quality value for each record in the dataset based on previous (or continuous) training and further generates the aggregated quality index for the entire data set based on the individual record quality values for the records that form the data set. In some examples, each record may be supplemented with its quality index, and the data set may be supplemented with the aggregated quality index for the data set. In some examples, each of the record and the data set may be supplemented to store a number of previous and current quality index values such that comparisons of current and previous quality index values can be performed. In some instances, users requesting data from one or more records of the data set can be provided with the respective quality index values for the one or more records and/or the aggregated quality index values for the data set and use the quality index values to better understand or determine whether operations using the one or more records will be impacted by the goodness or badness of the one or more records. Thus, knowledge of the goodness or badness of the records of the data sets may enable the user to make determinations or take actions according to the records or dataset with respect to further analytics based on the records.

Furthermore, a measure of goodness of a record may be a more meaningful way to express data quality for the record than other methods. For example, a record with 100 fields may likely have one or more fields with a missing or out of expected range value, such as a missing state field in the address. That same record may be judged by a data steward to be good enough for usage if the city and ZIP code fields are filled out. Similarly, it may be possible to find fault with almost all of the records, even though the data steward may determine that almost all of the records are usable. The disclosed technology systematically assign a percentage of goodness to each record and, thus, to each dataset by harnessing the judgement of the data steward to train the ML model. Application of the ML model to identify the RQI and DQI values described herein may enable data analysts and other users to determine how good a data set or record is when requesting the record from the data set.

The disclosed technology goal provides for measurement of how good or bad records of a data set are. By applying the ML model trained as described herein, problems that arise when trying to manually monitor/classify records or generate code to decide if a record is good or bad in view of multi-field interdependencies are avoided. Moreover, training the ML model to compensate for new rules is easier than trying to manually account for or generate code to account for such new rules, Instead, when a new rule is to be added to train the ML model, missing records corresponding to the new rule can be identified and used to retrain the ML model. In that way, RQI and DQI values can be generated that account for the new rule.

FIG. 1 illustrates an example networked environment 100 that implements various features of examples described in the present disclosure. The networked environment 100 comprises a network 110 that enables data communications between various components and/or modules shown. The various components shown that communicate via the network 110 comprise a record processing system 120, a records data store 130, a record scoring system 140, and a record source 150.

The network 110 may comprise one or more wired and/or wireless communication networks that enable multiple devices that are co-located or remotely located relative to each other to communicate data and/or information using hardwired and/or wireless communications. The wireless and/or wired communication networks may interconnect nearby or remote devices or systems using one or more networking protocols, such as wireless 802.11 protocols. The network 110 may also serve as a gateway to other networks, not shown.

The devices that communicate over the network 110 may comprise any computing device configured to transmit and receive data and information for an entity via the network 110. The entity may correspond to an individual or an institution, such as a business, a supplier, a system integrator, a financial institution, and so forth. The computing device may comprise one or more personal computing devices, server computing systems, cloud-based computing systems, databases, and the like. The computing devices that communicate via the network 110 may comprise network interfaces that physically or wirelessly couple the computing devices to the network 110 and enable communications therewith. In some examples, the computing device may be accessible locally as well as remotely via the network 110.

The record processing system 120 may comprise a computing device or system that enables one or more users to process records, such as records stored as part of one or more data sets in the records data store 130. In some examples, the record processing system 120 may enable the users to access one or more records in the one or more data sets stored in the records data store 130 and use the accessed records to perform various actions or analyses. For example, a user using the record processing system 120 may identify that a set of customers previously received a product having a known concern. The user may use the record processing system 120 to access records for the set of customers in the records data store 130 associated with the product having the known concern. Thus, the record processing system 120 may be configured to receive a user request for the one or more records of interest to the user and convey a corresponding record request to the records data store 130. In some examples, the record request conveyed by the record processing system 120 to the records data store 130 may comprise a record identifier or other data that enables identification of the record(s) of interest in the records data store 130. Additionally, the record processing system 120 may be configured to receive the requested record(s) from the records data store 130 and provide the received record(s) to the user that made the record request.

The records data store 130 may comprise a database or similar data storage component that stores one or more records in association with one or more data sets. The records data store 130 (and any other database, data source, or data storage component described herein) may comprise any data structure (and/or combinations of multiple data structures) for storing and/or organizing data. Examples of such data structures include relational databases, such as Oracle databases, MySQL databases, and so forth, non-relational databases, such as NoSQL databases, and so forth, in-memory databases, spreadsheets, comma separated values ("CSV") files, eXtendible markup language ("XML") files, TeXT ("TXT") files, flat files, spreadsheet files, and/or any other public or proprietary format for data storage.

In some examples, when communicating via the network 110, the records data store 130 provides one or more records stored therein to a networked device, such as the record processing system 120, in response to a records request. In some examples, the records data store 130 is able to process the one or more records stored therein based on the records request, which may comprise one or more of a record identifier or a value of interest for which records in the records data store 130 can be searched.

In some examples, in addition to parsing and searching records in the record data store 130, the records data store 130 can perform one or more data clean-up or cleaning logic or processes, data verification logic or processes, and so forth to clarify, verify, and/or improve quality of data stored as or related to the records stored therein. Examples of such data cleaning logic include deduplication logic, data range verification logic, data fill logic, and so forth.

As introduced above, the records stored in the records data store 130 may include one or more related data items. The one or more related data items making up a record may be related, for example, by a common key value, a common index value, a common identifier, and so forth. For example, a record stored in the records data store 130 may comprise details regarding a product manufactured and/or distributed by a business. The details stored in the record may include various related data, such as a customer name of a customer to which the product was distributed, an address of the customer, a contact person associated with the customer (for example, when the customer is an entity), a contact e-mail address for the contact person and/or the customer, a phone number for the contact person and/or the customer, a serial number or identifier of the product, a product name or identifier, a name for an end user that purchased the product from the customer, and so forth. Thus, the record may include a field for each of the related data. In some examples, each record may also include details regarding the record itself, such as a record identifier, a data set identifier (where the data set is a collection of associated or related records), a record quality index value, historical record quality index values, and the like.

The record scoring system 140 may comprise a computing system, model, algorithm, and so forth, configured to generate a record quality index (RQI) value for each record processed by the record scoring system 140, where the RQI value for a particular record may correspond to a goodness or badness of the record. The goodness or badness of the record may relate to the data stored in the record. More specifically, the goodness or badness of the record may correspond to whether the data stored in the record is more correct (i.e., more good) or more incorrect (i.e., more bad). In some examples, the goodness/badness of the record corresponds to whether the record contains values that can be correct as opposed to evaluating the correctness of the record. For example, a record with a high goodness may comprise fields that are populated with values within an expected range or in an expected format, and so forth, while a record with a high badness may comprise fields that are not populated or populated with values outside the expected range or not in the expected format, and so forth. The goodness or badness may be measured on a scale from zero to one, where zero is a record that includes all incorrect data (e.g., unpopulated fields or out of range values, etc.) and, thus, has a "high" badness score and "low" goodness score, and where one is a record that includes all correct data (e.g., properly populated fields and in range values, etc.) and, thus, includes a "high" goodness score and "low" badness score. In some instances, the record may be assigned an RQI of 0 or 1, where a record assigned a 1 is a record that comprises all correct data or mostly correct data and a record assigned a 0 is a record comprising any incorrect data, mostly incorrect data, or all incorrect data.

In some examples, identifying the RQI value for a record comprises analyzing each value for each field in the record and determining whether each field includes a valid value. In some examples, the valid value represents whether the value is complete or could be correct and not whether the value is actually correct. For example, the record scoring system may determine that a field for a record comprising an address for a customer is valid if it includes each of street address information, city information, state information, and ZIP code information. However, the record scoring system 140 may not determine whether the address information is correct (i.e., is the correct address for the corresponding customer). The record scoring system 140 may aggregate such validity analyses for all the fields of the record and determine the RQI value for the record accordingly. In some examples, different fields may be weighted differently and the record scoring system 140 may account for such weighting in its analysis of all the fields of the record and determination of the RQI. Based on this analysis, the record scoring system 140 may classify or score individual records with a particular value representing the goodness/badness of the records. In some examples, the record scoring system 140 may append each processed record with a field comprising the RQI value for the processed record. Additionally, the record scoring system 140 may append each processed record with a field comprising a previous or historical RQI value for the processed record.

In some examples, the record scoring system 140 comprises a machine learning (ML) algorithm or model for measuring and scoring a quality (i.e., goodness/badness) of a record. In summary, the ML model can be trained using training data or records comprising known good records and bad records. The trained ML model may then be used to identify good and bad records processed by the record scoring system 140 based on learning from the training. Further details of an example ML model are provided below with reference to FIG. 2.

The record source 150 may comprise a source of new records or a source for data values stored in the records. In some examples, these new records received by or from the record source 150 are processed by the record scoring system 140 to generate a RQI value for each new record and then stored in the records data store 130 with the corresponding RQI value. In such instances, the record scoring system 140 may update DQI values for each data set for which a new record or new data is populated.

Figure 2:
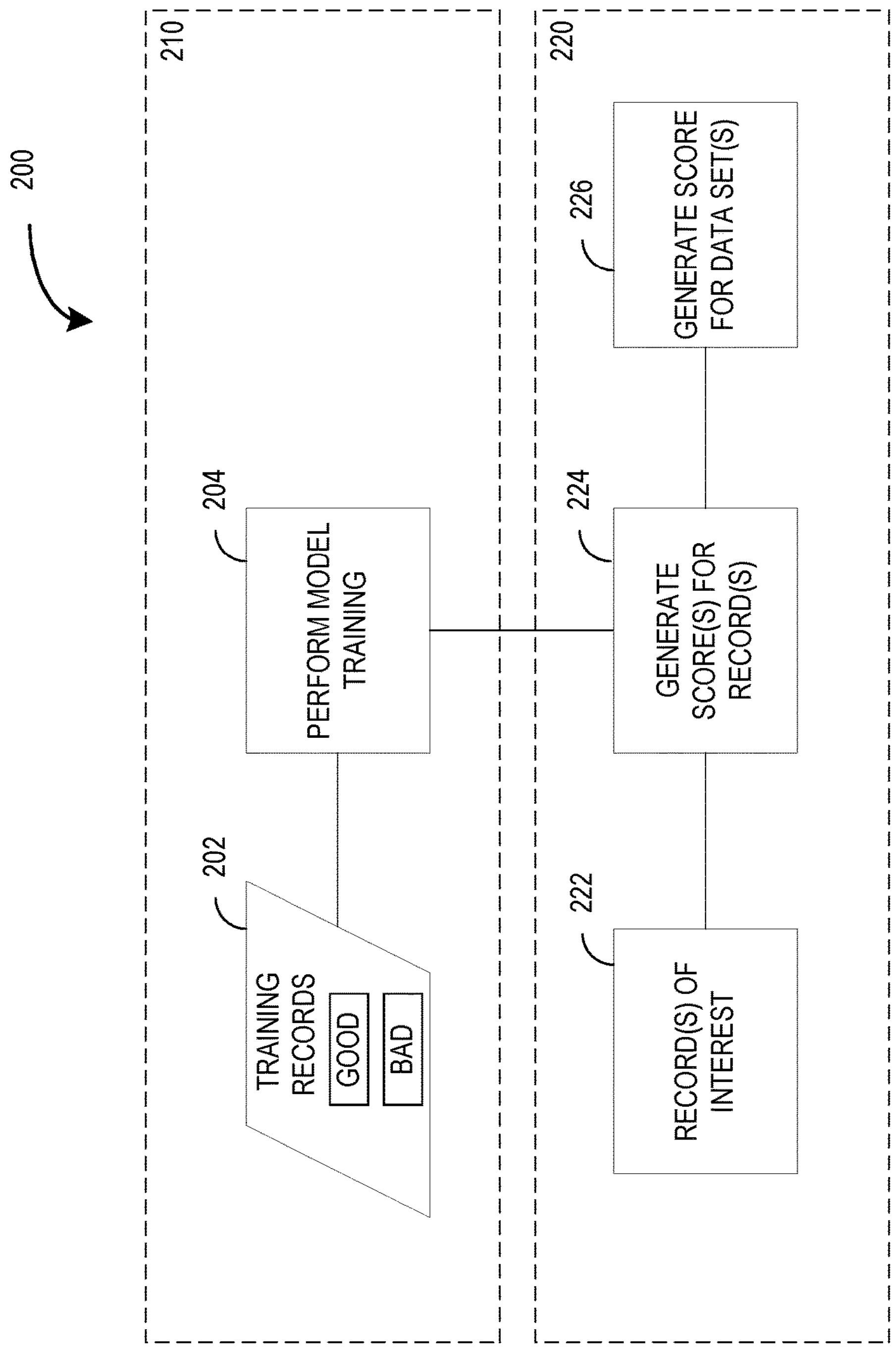
FIG. 2 depicts an example process flow 200 for an example machine learning model or algorithm that implements various features of examples described in the present disclosure.

FIG. 2 depicts an example process flow 200 for an example machine learning model or algorithm that implements various features of examples described in the present disclosure. The process flow 200 comprises a training leg 210 and an application leg 220. Though not shown, the process flow 200 may also comprise a testing leg. In some examples, the process flow 200 training let 210 may be performed by the record scoring system 140 of FIG. 1 when training the record scoring system 140 to generate RQI and DQI values for each record and data set processed by the record scoring system 140. The process flow 200 application leg 220 may be performed when using the record scoring system 140 to generate the RQI and DQI values for each record and data set processed by the record scoring system 140.

The training leg 210 of the process flow 200 may begin with training records 202, which may comprise "good" training records and "bad" training records. The good training records may correspond to those training records having corresponding data that the records are good or have a higher goodness value than badness value. The bad training records may correspond to those training records having corresponding data that the records are bad or have a higher badness value than goodness value. Thus, the good training records may have higher RQI values than the bad training records. In some examples, the good and bad training records are manually identified from a training data set by one or more data stewards or processing systems based on application of one or more rules, checks, and/or stored procedures. Discrimination between good and bad records by the data stewards may be based on a single field issue, multiple fields, out of range values, missing data, invalid data, and so forth. For example, the data steward or processing system may determine that a majority of fields in the good training records comprise valid data while a majority of fields in the bad training records comprise invalid data. In some examples, the determined good training records are assigned an RQI value of 1 while the determined bad training records are assigned an RQI value of 0. In some examples, the good and bad training records may be assigned RQI values on a scale of 0 (bad) to 1 (good). The good and bad training records may be combined to form the training records 202.

In some examples, the training of the ML model in the training leg 210 comprises identification of some of each of good and bad records and, based on pattern matching, identification of thousands of good and bad records. Good records may be easier to identify where good records should be the norm and the majority in the data set. However, to avoid unbalanced distributions, generating the training records 202 may comprise oversampling the bad records and under sampling the good records. In some examples, the training records 202 may comprise 10,000 bad records and 10,000 good records to train the ML model to be applied to a data set of hundreds of thousands or millions (or more) records.

The training records 202 are used to perform model training 204. In some examples, the model training at 204 corresponds to training of a ML model or algorithm. The ML model being trained may comprise a classification model, such as a Random Forest model, a decision tree model, a logistic regression model, a gradient-boosted tree model, and so forth. Alternatively, other types of ML models, such as clustering models or regression models may also be trained to identify and classify records and generate corresponding RQI and DQI values. In some examples, the ML model training 204 comprises training the ML model to generate a relative metric on how good or bad a record being processed is, where this relative metric corresponds to the RQI of that record. For example, because the good training records are assigned or classified with RQI values of 1 and the bad training records are assigned or classified with RQI values of 0, the ML model can be trained using the good and bad training records to generate the RQI value for a record being processed on a scale of 0 to 1. That is, even when the ML model is trained as a classifier to discriminate between good (RQI value of 1) and bad (RQI value of 0) records, examples of the disclosed technology leverage probability (which can come before the application leg function) as the RQI. In this way RQIs can be considered to be, e.g., an ML output probability of a record being good or bad, and its values range from 0 to 1, which depending on the thresholds, the final classifier can be 1 or 0. However, and again, in some examples, probability is of greater interest than a final classification. As suggested herein, the closer to 1 the RQI value for the record is, the higher the goodness of the record, while the closer to 0 the RQI value is, the higher the badness of the record.

Using the 10,000 good records and 10,000 bad records of the training records 202, a Random Forest ML model may be built and trained. The Random Forest ML model may be trained with a near 0.99 area under the receiver operating characteristic curve (ROC AUC). Once the ML model is trained, the whole data set of interest can be fed through the ML model to classify individual records with corresponding RQIs, and a DQI for the data set is determined, as described in more detail below.

Once the ML model is trained at 204, the training leg 210 is completed and the application leg 220 begins. At 222, one or more records of interest are received or obtained. These records of interest may correspond to one or more records of a data set of interest for which the DQI and RQI for corresponding records have not yet been calculated or newly received records from the source system 150. For example, in some examples, the records of interest are received from the records data store 130 in response to a request received via the record processing system 120, and so forth, or received directly from the record source 150 before being stored in the records data store 130. In some examples, the record(s) of interest 222 comprises all records of a particular data set when a record not having an RQI is requested from the particular data set to be able to provide the DQI for the particular data set or when the particular data set for the requested record does not have the DQI.

The ML model trained at 204 can then be applied to the record(s) of interest from 222 to generate the RQIs for the records at 224. For example, the ML model may generate the RQI for the record of interest 222 based on the training of 204 of the Random Forest ML model, by which the ML model learned to determine where the record of interest 222 falls on the 0-to-1 scale of bad to good records. In some examples, generating the score(s) for the record(s) may further comprise amending the record(s) to include the corresponding score(s). For example, when the ML model generates a score for a record of, for example, 0.75 on the scale of 0-to-1, the record, comprising an RQI field, may be updated to include the value of 0.75 in the RQI field, the RQI field corresponding to the RQI for the record. Where the record comprises an existing value in the RQI field, the existing value may be stored in a historical RQI field to enable comparison of the historical RQI value with a current RQI value. In some examples, where the record(s) for which the ML model is applied to generate score(s) belong to one or more data set(s), the DQI for the data set(s) can be generated at 226. In some examples, each record may be configured to store a number of current and/or historical RQI values to enable comparing of the RQI for the record as the record is changed.

In some examples, the DQI is generated for a data set based on averaging the RQIs for the records that form the data set. In some examples, the DQI for the data set is stored in the data set, for example, in a DQI field in each record of the data set, in a DQI record in the data set, and so forth. Where the data set comprises an existing DQI value in the, the existing DQI value may be stored in a historical DQI field to enable comparison of the historical DQI value with a current DQI value. In some examples, the data set may be configured to store a number of current and/or historical DQI values to enable comparing of the DQI for the data set as records in the data set change or increase or decrease in number.

In some examples, though not shown in FIG. 2, the RQI and DQI values generated by the ML model with respect to the process flow 200 may be used to evaluate effectiveness of operations performed on the corresponding record(s) or data sets. For example, data stewards and/or analysts may perform manual or automated cleaning, update, and similar processes on one or more records of one or more data sets. For example, one manual or automated cleaning process may comprise populating missing fields in records or eliminating duplicate records in a data set. Some such processes involve determining a best source of information. In some examples, the RQI and DQI generated by the disclosed technology may provide for a determination whether such processes should be used and whether changes made pursuant to such processes should be maintained. Furthermore, the RQI and DQI may enable quantification and/or tracking of the goodness of a record or an entire dataset as a trend over time.

For example, application of a cleaning or other process can result in a RQI for a record or a DQI of a data set. By comparing the RQI for the record and/or the DQI for the data set, an analysis can be made regarding whether the process applied to the record or data set improved a goodness of the record or data set. For example, if a cleaning process applied to a record reduces the RQI for the record, by comparing the RQI following the cleaning process to an RQI preceding the cleaning process, the cleaning process can be determined to be a poor or undesirable cleaning process, at least for that record. Following such a determination, the cleaning process may be reversed or changed. In circumstances where the cleaning process populates the record with data or values from a particular source, when the cleaning process reduces the RQI value, the cleaning process can be changed such that the cleaning process collects better information from a different, better source. Similarly, the dataset can be objectively evaluated to determine if a change resulting from a cleaning or other process was an improvement (e.g., improved the DQI) or if it created unintended data quality issues (e.g., reduced the DQI). Contrary to solutions in which the data steward manually evaluates a sample of records, which is both subjective and time consuming, the RQI and DQI values calculated pursuant to the ML model described herein enables identification of issues presented by the cleaning or other processes in a more objective and automated process. Furthermore, the RQI and DQI value analyses described herein enable identification of additional issues or concerns with respect to data quality where random (or even structured) sampling to evaluate records in a manual manner by the data steward may miss adversely effects on records that are not sampled by the data steward, such as records that are indirectly impacted by the cleaning or other process.

In some examples, where the cleaning or other process adversely impacts the RQI of a record or DQI of a data set, the process may be modified or reversed. Modifying the process may comprise changing a source used in the process, such as a source of data that is used to fill one or more fields, a source used to identify a range for a particular field, and so forth, based on impacts to the RQI or DQI.

FIG. 3 illustrates an example computing component that may be used to implement model optimization for an example model that scores data used in analytical applications in accordance with various examples. Referring now to FIG. 3, computing component 300 may be, for example, a computing device, a computing server, a system controller, or any other similar computing component capable of communicating and processing data. In the example implementation of FIG. 3, the computing component 300 includes a hardware processor 302 and machine-readable storage medium 304.

The hardware processor 302 may be one or more central processing units (CPUs), semiconductor-based microprocessors, and/or other hardware devices suitable for retrieval and execution of instructions stored in the machine-readable storage medium 304. The hardware processor 302 may fetch, decode, and execute instructions, such as instructions 306-320, to control processes or operations for training and applying models and/or algorithms to generate DQI and RQI values for data sets and records, respectively, and performing corresponding processing. As an alternative or in addition to retrieving and executing instructions, hardware processor 302 may include one or more electronic circuits that include electronic components for performing the functionality of one or more instructions, such as a field programmable gate array (FPGA), application specific integrated circuit (ASIC), or other electronic circuits.

A machine-readable storage medium, such as machine-readable storage medium 304, may be any electronic, magnetic, optical, or other physical storage device that contains or stores executable instructions. Thus, machine-readable storage medium 304 may be, for example, Random Access Memory (RAM), non-volatile RAM (NVRAM), an Electrically Erasable Programmable Read-Only Memory (EEPROM), a storage device, an optical disc, and the like. In some examples, machine-readable storage medium 304 may be a non-transitory storage medium, where the term "non-transitory" does not encompass transitory propagating signals. As described in detail below, machine-readable storage medium 304 may be encoded with executable instructions, for example, instructions 306-320.

The hardware processor 302 may execute instruction 306 to train a model based on a first set of approved records and a second set of declined records. In some examples, the first set of approved records corresponds to the good training records described above, while the second set of declined records corresponds to bad training records described above. Training the model via instruction 306 may correspond to training the ML model with the good and bad training records, as described above with respect to FIG. 2. As such, the instruction 306 may cause the hardware processor 302 to train the ML model to evaluate a record and generate or predict a quality score, such as the RQI, for each record processed by the trained ML model.

The hardware processor 302 may further execute instruction 308 to apply the trained ML model to each record of a record, or data, set of interest. In some examples, the record set of interest may comprise one or more records relating to a particular product or customer, and so forth. Execution of instruction 310 may comprise employing the ML model to generate a RQI score for each record of the record set of interest to which the trained ML model is applied via instruction 308. In some examples, execution of the instruction 310 further comprises updating each record of the record set of interest with the generated RQI score, where the RQI score corresponds to the RQI value introduced above.

The hardware processor 302 may further execute instruction 312 to calculate a DQI score for the entire record set of interest. As introduced above, the DQI score may be based on averaging the RQI scores for each record of the record set of interest. For example, the RQI score for each record of the record set may be summed together and divided by a number of records in record set. In some examples, the RQI score for each record may be stored in the respective record and the DQI score may be stored in or associated with the record set of interest. As introduced above, where the records and/or the record set of interest included a previous RQI or DQI value, respectively, the previous RQI or DQI value can be stored as a historical RQI or historical DQI value, respectively.

Execution of instruction 314 may comprise applying one or more cleansing or other operations or processes to the record set of interest. The applied operation or process may change one or more of the records of the record set of interest such that the DQI for the record set of interest changes. Subsequently, execution of instruction 316 by the hardware processor 302 may apply the trained ML model to each record of the record set of interest following the applied process. This application of the trained ML model following the applied process from execution of instruction 316 may lead to execution of instruction 318 to generate RQI values for each record of the record set of interest and the DQI for the record set of interest following the applied process. These revised RQI and DQI values may be stored or associated with the respective records and record set of interest.

The hardware processor 302 may execute instruction 320 to compare the revised RQI and DQI values with the respective previous RQI and DQI values. Where the revised RQI and/or DQI values are lower than the respective previous RQI and DQI values, then the applied operation from instruction 314 may be modified or revised. For example, where the applied operation from instruction 314 comprises populating one or more records with data from a source, instruction 320 may change the source for such populating based on a reduction of the RQI and/or DQI values following the applied process. On the other hand, where the revised RQI and DQI values increase as compared to the previous RQI and DQI values, the applied operation from instruction 314 may be maintained and/or recommended for other record sets of interest.

Further to discussion above regarding a user requesting one or more records for further analysis and/or analytics, such a request may include a request for a corresponding RQI value. In some examples, knowledge of the RQI value for the requested record may enable the user to determine whether the information in the record is reliable (i.e., good) or not. Furthermore, knowledge of the RQI value may enable the user to determine whether particular information is likely reliable or not. For example, when a record has an RQI value that is close to 1 (for example, between 0.85 and 1), the user may determine that particular fields, such as customer name, customer address, end username, and end user contact information are likely to be reliable as opposed to when the record has the RQI value less than, for example, 0.3. Where certain fields are weighted differently with respect to the RQI value for the record, the more highly weighted fields may be more likely to be reliable when the RQI value is closer to 1 and less likely to be reliable when the RQI value is closer to 0. Where the requested record does not comprise an RQI value, the ML model described herein may be applied to identify one or more of the RQI or DQI, as describe with reference to FIG. 4A below.

Where the user is analyzing the benefits or detriments of a particular operation that is applied to a record set of interest, the ML model described herein may be applied to identify RQI and/or DQI values for comparison and analysis of the process, as described with reference to FIG. 4B below.

Figure 4A:
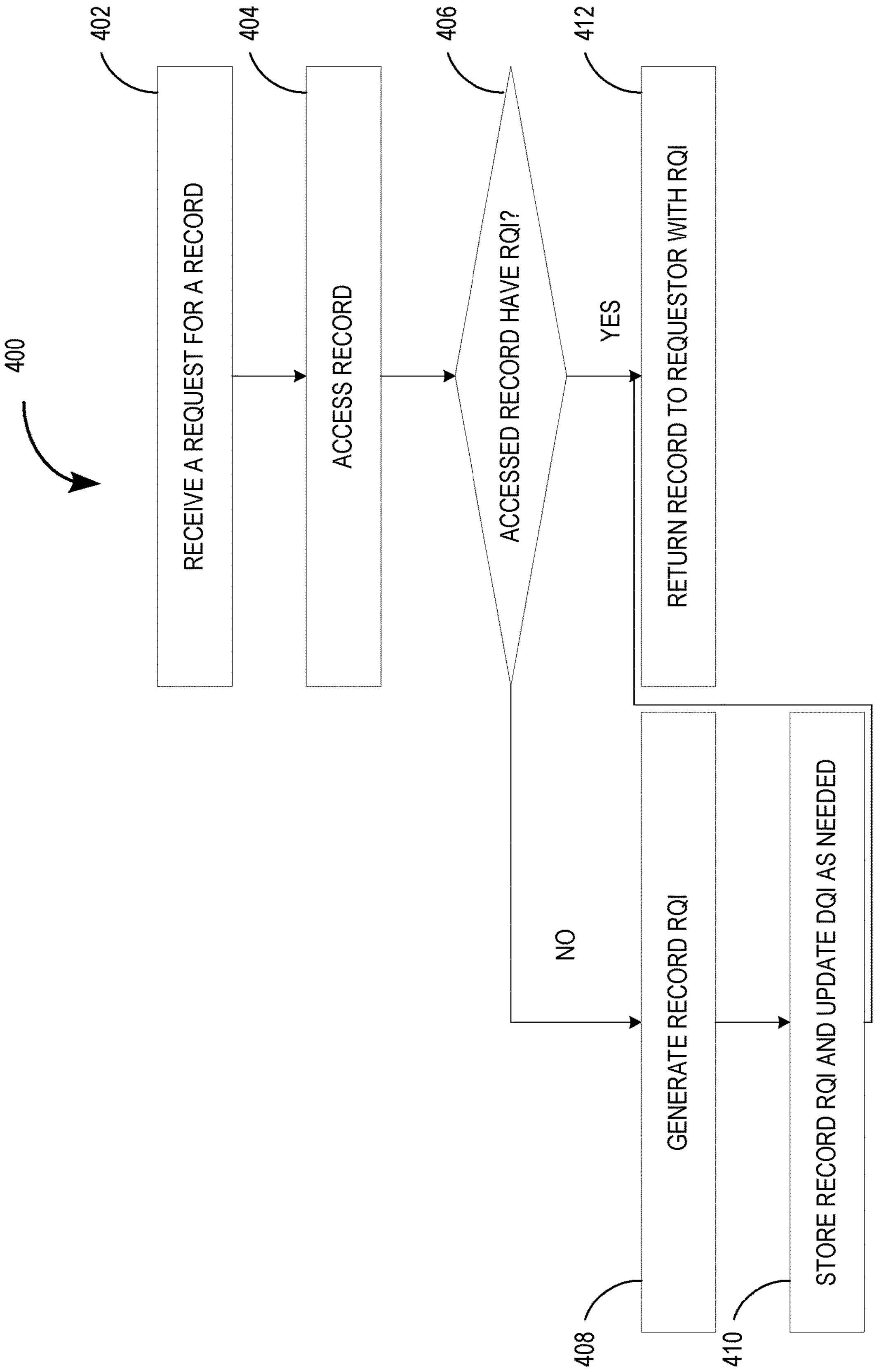
FIGS. 4A and 4B depict example data flows implementing various features of examples described in the present disclosure.

FIG. 4A depicts an example data flow 400 for a process for providing a record in response to a record request. Operations that make up the data flow 400 may be performed by one or more devices of, for example, the networked environment 100, such as the record scoring system 140, the records data store 130, the record processing system 120, and so forth. In some examples, the operations of the data flow 400 may be performed in a different order than shown or may include additional or fewer operations than shown.

The data flow 400 includes operation 402, where a request for a record is received, for example, from a user. In some examples, the record processing system 120 may perform the operation 402. The request for the record may include a record identifier or other identifying information that indicates the record being requested. In some examples, the record request at operation 402 comprises an identifier for a data set associated with the requested record. While the data flow 400 as shown relates to RQI values, similar processing steps can be applied for DQI values, as discussed below.

Based on the received request, the data flow 400 includes operation 404, where the requested record is accessed. Thus, the operation 404 may be performed by the record processing system 120 in combination with the records data store 130. As such, the record processing system 120 may request the identified record from the records data store 130. In some examples, the record processing system 120 may request all records of a data store when the data store is identified in the request at operation 402.

The data flow 400, at operation 404, determines whether the accessed record includes an RQI value. Where the data flow 400 accesses a data set, the operation 404 determines whether the accessed data set comprises a DQI value. In some examples, the determination of whether the record includes the RQI (or whether the data set comprises the DQI) is made by the records data store 130. If the accessed record does not include the RQI value (or the accessed data set does not include the DQI value), the data flow 400 continues to operation 408.

At operation 408, the accessed record not having the RQI (or the accessed data set not having the DQI) is processed to generate the corresponding RQI or DQI. In some examples, such processing is performed by the record scoring system 140, Any generated RQI or DQI is stored, at operation 410, in the record or in the data set, respectively. The operation 410 can be performed by the record scoring system 140 and/or the records data store 130.

At operation 412, when the record does include the RQI (or the data set comprises the DQI) at operation 406 or once the RQI (or DQI) is stored and updated at operation 410, the requested record (or requested data set) is returned to the record processing system 120 with the corresponding RQI (or DQI).

By the data flow 400, the networked environment 100, or a similar combination of devices, may respond to a request for one or more records or a data set of records while providing the requesting entity with additional information (i.e., the RQI or DQI values) that enable the requesting entity to understand whether the requested and accessed records are good records or bad records. Such additional information, provided in response to the request, can enable the requesting entity to better use, ignore, or take additional actions based on the received record(s). For example, though not shown in FIG. 4A, the requesting entity can ignore the received record(s) when the RQI or DQI indicate that the received record(s) are bad, can reverse a previous action when the RQI or DQI indicate that a recent change to the record(s) made the corresponding RQI or DQI values worse than before the recent change, or can otherwise use the received record(s) when the RQI or DQI values indicate that the record(s) are good records.

Figure 4B:
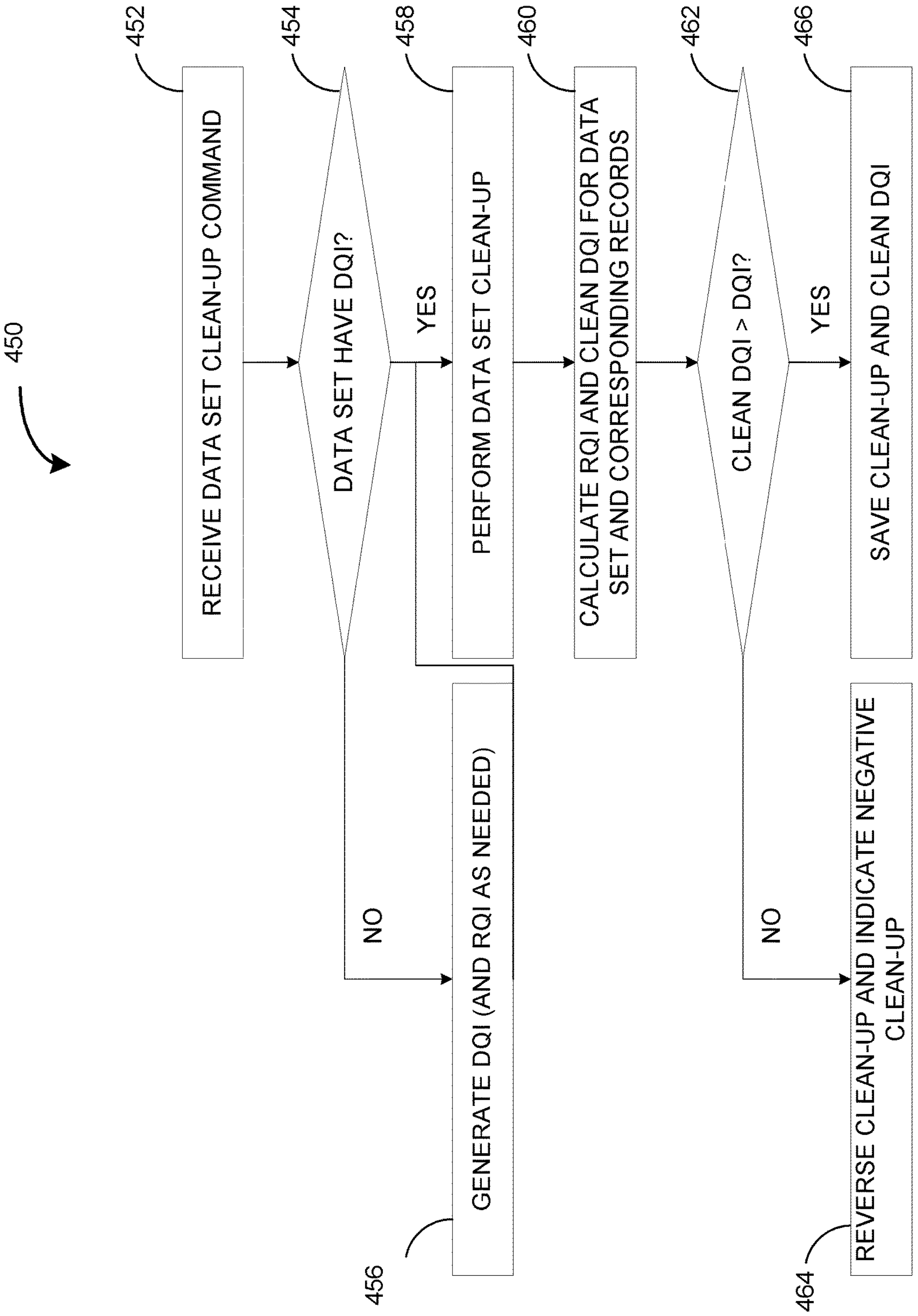

FIG. 4B depicts an example data flow 450 for a process for determine whether to maintain a cleaning, or other, operation applied to a data set. Operations that make up the data flow 450 may be performed by one or more devices of, for example, the networked environment 100, such as the record scoring system 140, the records data store 130, the record processing system 120, and so forth. In some examples, the operations of the data flow 450 may be performed in a different order than shown or may include additional or fewer operations than shown.

The data flow 450 includes operation 452, where a data set clean-up command is received. The data set clean-up command may be received from a data steward, a processing system, and the like. The clean-up command may trigger application of a clean-up logic or the like to the data set. As introduced above, the clean-up logic may identify invalid data in the data set, reduce duplicate records in the data set, and so forth. In some examples, the record processing system 120 may receive the data set clean-up command at operation 452.

Based on the received command, the data flow 450 includes operation 454, where the data set is analyzed to determine whether it has a DQI. Such analysis may be performed by the records data store 130, for example.

Where the data set does not include the DQI, the data flow 450 includes operation 456, where the record scoring system 140 may determine the RQIs for the records of the data set and determine the DQI for the data set based on averaging the corresponding RQIs. Once the DQI value (and/or RQI values) are generated at operation 456, or if the data set has the DQI at operation 454, the data flow 450 performs a data set cleanup at operation 458. In some examples, the clean-up is performed by the records data store 130 and/or the record processing system 120.

Following the clean-up at operation 458, the data flow 450 includes calculating clean RQI and DQI values for the cleaned records and data set at operation 460. In some examples, the clean RQI and DQI value calculations are performed by the record scoring system 140.

At operation 462, the clean DQI and RQI values are compared to the DQI and RQI values from before the clean-up. If the clean DQI and/or RQI values are higher than the corresponding DQI and RQI values from before the cleanup, then the clean-up can be saved with the clean DQI at operation 466. However, if the clean DQI and/or RQI values are lower than the corresponding DQI and RQI values from before the cleanup, then the clean-up can be reversed at operation 464. In some examples, the operations 462, 464, and 466 can be performed by the record processing system 120 and/or the records data store 130.

By the data flow 450, the networked environment 100, or a similar combination of devices, may monitor effectiveness of operations or processes applied to one or more records or data sets. Where an applied process is detrimental, data flow 450 can enable detection of such detrimental impact and reverse the process and where the applied process is beneficial, the results of the process can be saved. By enabling such detection and response to results of applied processes, records and data sets can be better managed such that users are provided with the best records (i.e., records with the highest available RQIs) for further analytics, etc.

Figure 5:
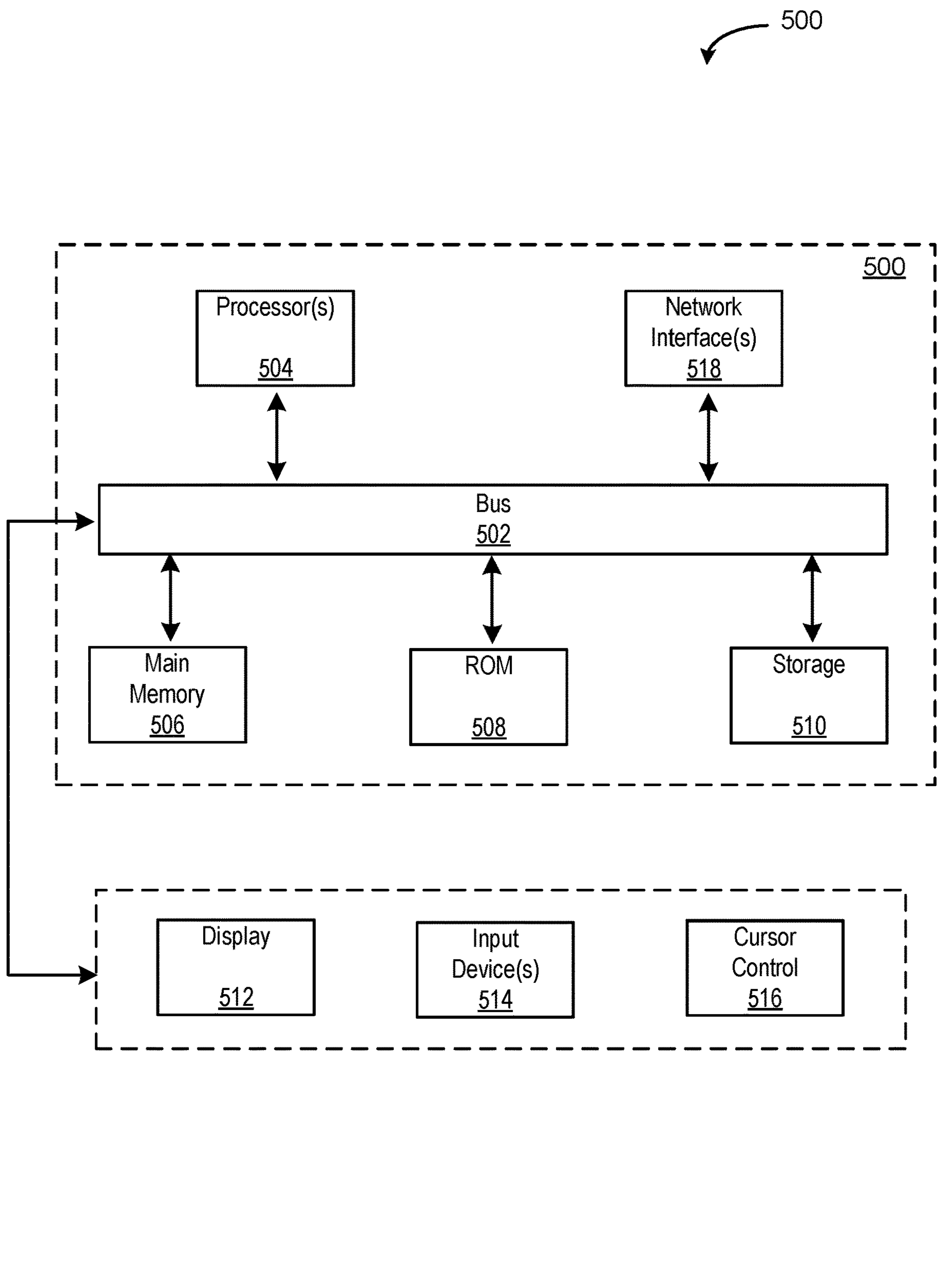
FIG. 5 is an example computing component that may be used to implement various features of examples described in the present disclosure.

FIG. 5 depicts a block diagram of an example computer system 500 in which various of the examples described herein may be implemented. The computer system 500 includes a bus 502 or other communication mechanism for communicating information, one or more hardware processors 504 coupled with bus 502 for processing information. Hardware processor(s) 504 may be, for example, one or more general purpose microprocessors.

The computer system 500 also includes a main memory 506, such as a random access memory (RAM), cache and/or other dynamic storage devices, coupled to bus 502 for storing information and instructions to be executed by processor 504. Main memory 506 also may be used for storing temporary variables or other intermediate information during execution of instructions to be executed by processor 504. Such instructions, when stored in storage media accessible to processor 504, render computer system 500 into a special-purpose machine that is customized to perform the operations specified in the instructions.

The computer system 500 further includes a read only memory (ROM) 508 or other static storage device coupled to bus 502 for storing static information and instructions for processor 504. A storage device 510, such as a magnetic disk, optical disk, or USB thumb drive (Flash drive), etc., is provided and coupled to bus 502 for storing information and instructions.

The computer system 500 may be coupled via bus 502 to a display 512, such as a liquid crystal display (LCD) (or touch screen), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. In some examples, the same direction information and command selections as cursor control may be implemented via receiving touches on a touch screen without a cursor.

The computing system 500 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In some examples, the computing system 500 may comprise one or more of the record processing system 120, the records data store 130, the record scoring system 140, and the source system 150. As such, the computing system 500 may process the data flow 400 of FIG. 4A, the data flow 450 of the FIG. 4B, the instructions of the machine-readable storage media 304, and the like.

In general, the word "component," "engine," "system," "database," data store," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 500 may implement the techniques described herein using customized hard-wired logic, one or more ASICs or FPGAs, firmware and/or program logic which in combination with the computer system causes or programs computer system 500 to be a special-purpose machine. According to one example, the techniques herein are performed by computer system 500 in response to processor(s) 504 executing one or more sequences of one or more instructions contained in main memory 506. Such instructions may be read into main memory 506 from another storage medium, such as storage device 510. Execution of the sequences of instructions contained in main memory 506 causes processor(s) 504 to perform the process steps described herein. In alternative examples, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 510. Volatile media includes dynamic memory, such as main memory 506. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 502. Transmission media can also take the form of acoustic or light waves, such as those generated during radio-wave and infra-red data communications.

The computer system 500 also includes a communication interface 518 coupled to bus 502. Network interface 518 provides a two-way data communication coupling to one or more network links that are connected to one or more local networks, such as the network 110. For example, communication interface 518 may be an integrated services digital network (ISDN) card, cable modem, satellite modem, or a modem to provide a data communication connection to a corresponding type of telephone line. As another example, network interface 518 may be a local area network (LAN) card to provide a data communication connection to a compatible LAN (or WAN component to communicated with a WAN). Wireless links may also be implemented. In any such implementation, network interface 518 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the worldwide packet data communication network now commonly referred to as the "Internet." Local network and Internet both use electrical, electromagnetic or optical signals that carry digital data streams. The signals through the various networks and the signals on network link and through communication interface 518, which carry the digital data to and from computer system 500, are example forms of transmission media.

The computer system 500 can send messages and receive data, including program code, through the network(s), network link and communication interface 518. In the Internet example, a server might transmit a requested code for an application program through the Internet, the ISP, the local network and the communication interface 518.

The received code may be executed by processor 504 as it is received, and/or stored in storage device 510, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example examples. The performance of certain of the operations or processes may be distributed among computer systems or computers processors, not only residing within a single machine, but deployed across a number of machines.

As used herein, a circuit might be implemented utilizing any form of hardware, software, or a combination thereof. For example, one or more processors, controllers, ASICs, PLAs, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer system 500.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain examples include, while other examples do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A method, comprising:

training a model based on a first set of approved records and a second set of declined records, where the first set of records and the second set of records each comprise a plurality of records;

receiving a clean-up command to apply one or more record cleansing operations to a record set of interest;

based on receipt of the clean-up command:

applying the trained model to each record of the record set of interest;

generating a quality score for each record of the record set based on application of the trained model to each record of the record set; and calculating, for the record set, a first data quality index based on averaging the quality scores for each record of the record set;

applying the one or more record cleansing operations to the record set to create a processed record set;

reapplying the trained model to each record of the processed record set to generate a revised quality score for each record of the processed record set based on application of the trained model to each record of the processed record set;

calculating, for the processed record set, a second data quality index based on averaging the quality score for each record of the processed record set;

comparing the first data quality index for the record set and the second data quality index for the processed record set;

in response to the second data quality index for the processed record set being less than the first data quality index for the record set, reversing the one or more record cleansing operations, and modifying the one or more record cleansing operations or providing the record set after reversing the one or more record cleaning operations to a data system that generates an output by processing the record set; and in response to the first data quality index for the record set being less than or equal to the second data quality index for the processed record set, saving the processed record set and providing the processed record set to a data system that generates an output by processing the processed record.

2. The method of claim 1, further comprising modifying the one or more record cleansing operations in response to the second data quality index for the processed record set being less than the data first quality index for the record set.

3. The method of claim 1, further comprising maintaining the one or more record cleansing operations in response to the first data quality index for the record set being less than or equal to the second data quality index for the processed record set.

4. The method of claim 1, wherein each record of the record set comprises a weight for each field in the record, each weight indicating a relative importance of the respective field relative to other fields of the record.

5. The method of claim 1, wherein the model comprises a Random Forest classification algorithm.

6. A system, comprising:

a database of records comprising a plurality of records, each record including a plurality of record fields and a quality field;

a request interface configured to receive a request for a record from the database of records;

a processor;

a memory configured to stored instructions that, when executed by the processor, cause the processor to:

retrieve the plurality of records stored in the database;

receive a clean-up command to apply a record cleansing operation to the plurality of records;

based on receipt of the clean-up command:

for each record:

apply an ML model to the record to generate a quality score for the record; and store the generated quality score in the quality field of the record;

update the record in the plurality of records;

average the quality score for each of the plurality of records to generate a first data quality index for the plurality of records;

apply the record cleansing operation to the plurality of records to generate a plurality of processed records;

apply the ML model to each record of the plurality of processed records to generate a revised quality score for each record of the plurality of processed records based on application of the ML model to each record of the plurality of processed records;

calculate, for the plurality of processed records, a second data quality index based on averaging the quality score for each record of the plurality of processed records; and comparing the first data quality index for the plurality of records and the second data quality index for the plurality of processed records;

in response to the second data quality index being less than the first data quality index, reversing the record cleansing operation, and modifying the record cleansing operation or providing the plurality of records after reversing the record cleaning operation to a data system that generates an output by processing the plurality of records; and in response to the first data quality index being less than or equal to the second data quality index, saving the plurality of processed records and providing the plurality of processed records to a data system that generates an output by processing the plurality of processed records.

7. The system of claim 6, wherein each record further includes a weight for each field in the record, each weight indicating a relative importance of the respective field relative to other fields of the record.

8. The system of claim 6, wherein the ML model comprises a Random Forest classification algorithm.

9. The system of claim 6, wherein the memory further comprises instructions that further cause the processor to modify the record cleansing operation in response to the second data quality index for the plurality of processed records being less than the first data quality index for the record set.

10. The system of claim 6, wherein the memory further comprises instructions that further cause the processor to maintain the record cleansing operation in response to the first data quality index for the record set being less than or equal to the second data quality index for the plurality of processed records.

11. The system of claim 6, wherein modifying the record cleansing operation comprises determining an alternative source of information with which to populate missing fields for one or more records of the plurality of processed records.

12. A method comprising:

receiving a clean-up command to apply a record cleansing process to a data set of records stored in a database;

based on receipt of the clean-up command:

determining whether the data set of records comprises a data set quality index;

upon a determination that the data set of records comprises the data set quality index, applying the record cleansing process to the data set of records to generate a processed data set based on the data set comprising the data set quality index, wherein the data set quality index has been calculated based on record set quality indices for records of the data set of records generated by applying a trained machine learning (ML) model to the records of the data set of records;

reapplying the trained ML model to the records of the processed data set to generate revised record set quality indices; and calculating a processed data set quality index for the processed data set based on the revised record set quality indices;

comparing the data set quality index and the processed data set quality index;

in response to the processed data quality index being less than the data quality index, reversing the record cleansing process, and modifying the record cleansing process or providing the data set of records after reversing the record cleaning process to a data system that generates an output by processing the data set of records; and in response to the data quality index being less than or equal to the process data quality index, saving the processed record data set and providing the processed data set to a data system that generates an output by processing the processed data set.

13. The method of claim 12, further comprising modifying the record cleansing process in response to the processed data set quality index being less than the data set quality index for the record set.

14. The method of claim 12, further comprising maintaining the record cleansing process in response to the data set quality index being less than or equal to the processed data set quality index.

15. The method of claim 12, wherein the records of the data set of records comprises a weight for each field in the record, each weight indicating a relative importance of the respective field relative to other fields of the record.

16. The method of claim 12, wherein the ML model comprises a Random Forest classification algorithm.

17. The method of claim 12, further comprising generating the data set quality index for the data set of records.

18. The method of claim 12, further comprising averaging the record set quality indices for each record of the data set, wherein the data set quality index comprises the average of the record set quality indices for each record of the data set.

19. The method of claim 12, wherein the processed data set quality index reflects an ML output probability reflecting validity or invalidity of a record.

20. The method of claim 12, wherein the modifying of the record cleansing process comprises determining an alternative source of information with which to populate missing fields for one or more records of the processed data set.

* * * * *